United States Patent [19]

Brook et al.

[11] 3,993,238

[45] Nov. 23, 1976

[54] BONDING OF ALUMINIUM ALLOYS

[75] Inventors: Greville Bertram Brook, High Wycombe; William Henry Bowyer, Farnham, both of England

[73] Assignee: Fulmer Research Institute Limited, England

[22] Filed: Jan. 2, 1975

[21] Appl. No.: 538,210

[30] Foreign Application Priority Data

Jan. 4, 1974 United Kingdom............... 478/74

[52] U.S. Cl.................... 228/198; 228/194; 228/234
[51] Int. Cl.² ........................................ B23K 1/04
[58] Field of Search .......... 228/193, 194, 195, 234, 228/238, 198, 217

[56] References Cited

UNITED STATES PATENTS

| 3,180,022 | 4/1965 | Briggs et al. ............... 228/197 X |
| 3,373,482 | 3/1968 | Miller ......................... 228/217 X |
| 3,581,382 | 6/1971 | Wells et al. .................. 228/198 |

*Primary Examiner*—Al Lawrence Smith
*Assistant Examiner*—K. J. Ramsey
*Attorney, Agent, or Firm*—Bacon & Thomas

[57] ABSTRACT

A process of diffusion bonding aluminium alloy parts uses zinc and copper layers, optionally with a tin layer, or magnesium and/or zinc layers as an interlayer material between the parts to be bonded. The interlayer is preferably formed by precoating one or both of the parts.

4 Claims, No Drawings

BONDING OF ALUMINIUM ALLOYS

This invention is concerned with the diffusion bonding of parts formed of the same or different aluminium alloys.

Diffusion bonding is a known technique for joining metal parts without forming the large volumes of cast metal typical of fusion welding and without causing bulk deformation and recrystallisation as occurs with pressure welding. Three techniques of diffusion bonding are generally recognised:

i. so-called "high pressure solid state bonding" in which an elevated temperature and high pressure are used for a relatively short time, ii. so-called "low pressure solid state bonding" in which an elevated temperature and a low pressure are used for a relatively long time, and iii. the use of metallic interlayer which gives rise to a transient liquid phase between the parts to be joined.

The present invention is not concerned with the first two techniques, but with a development of the third technique. Specifically the present invention is based on the discovery that excellent bonding can be effected between aluminium alloy parts by the use of a combination of zinc and copper layers and, if desired, a tin layer, or of magnesium and/or zinc layers as an interlayer between the parts to be bonded in a diffusion bonding process.

According to one aspect of the present invention, therefore, we provide a process for bonding aluminium alloy parts, which comprises providing an interlayer formed of a combination of zinc and copper layers and, if desired, a tin layer or formed of magnesium and/or zinc layers between the parts to be bonded, and maintaining the assembly of the parts to be bonded and the interlayer under sufficient pressure to keep the integers of the assembly in contact over the desired bond area, and at a sufficiently high temperature to cause melting of the interlayer material, the pressure and temperature being maintained until at least a part of the interlayer material has diffused into the aluminium alloy parts.

The interlayer materials used in the process have a melting point which is below the maximum temperature which is permissible for the process, that is the temperature above which undesirable changes in the structure of the parts to be bonded occurs, or are such that they readily form with the aluminium alloy, a eutectiferous mixture which melts below said maximum temperature.

It is believed that the interlayer materials used in the present process enable exceptionally good bonds to be obtained because they exhibit a combination of the following properties:

i. the liquid interlayer material (or the liquid eutectiferous material it forms with the metal to be bonded) wets the surfaces to be bonded and also has the property of reducing or dissolving any surface oxide film on the parts to be bonded, and ii. local alloying of the interlayer material with the parts to be bonded at the interface does not cause major change in the structure of the bonded alloy and no insoluble intermetallic compounds are formed between any of the components of the assembly.

The amount of interlayer material used should, in principle, be as small as possible. Thin foils of interlayer material may be used, for example having a thickness of 0.0005 inch, or a thin film of interlayer material may be formed on one or both of the surfaces to be bonded by any suitable method for forming thin metallic coatings, such as electroplating, vapour plating or metal evaporation.

As indicated above, the assembly of the parts to be bonded and the interlayer should be maintained under sufficient pressure to keep the integers of the assembly in contact during the diffusion process. Pressures which lead to deformation of the parts to be bonded are not required and should not be used. Pressures from 10 to 1000 lbf/in$^2$, more particularly at the lower end of this range, are preferably used.

The temperature required in the process will, of course, depend on the nature of the interlayer material. When a combination of zinc, copper and, optionally, tin is used, the temperature used is preferably from 250° to 400° C; as explained below, the nature of the product obtained at lower temperatures within this range is different from that obtained at higher temperatures. When magnesium is used, the temperature is preferably from 350° to 500° C and, more preferably from 425° to 475° C. When zinc or a combination of magnesium and zinc layers is used, the temperature is preferably from 400° to 450° C. The time required to complete bonding will depend on the amount and nature of the interlayer material used and also on the temperature, longer times being required at lower temperatures and vice versa. Acceptable bond strengths can be obtained with very thin materials by heating for as little as one minute up to a few minutes and with thick materials by heating for periods of 1 to 3 hours.

When using a combination of zinc, copper and, optionally, tin or of magnesium and zinc as the interlayer material, these elements are not mixed to form a single foil or coating of homogeneous composition, but are rather kept in separate layers. In the case of the zinc, copper and, optionally, tin combination, the zinc must be coated on the aluminium surfaces to be bonded, since if the zinc were present in a separate foil, the molten zinc formed therefrom during the heating stage would not be particularly effective in dissolving or reducing the stable oxide film on the aluminium surface. The copper and tin, if present, of this combination may be used in the form of a separate foil (a composite foil having distinct layers formed by roll bonding preformed foils of copper and tin being used when tin is present in the combination). Preferably, however, the copper and tin, if used, are coated successively on the zinc coating already formed on the aluminium surface. Tin is only used when two composite copper/tin foils are used between the parts to be bonded or when both surfaces are pre-coated with the zinc/copper/tin combination. In this case, the two composite copper/tin foils are arranged with the two tin layers in contact; when both the aluminium surfaces to be bonded have been precoated with the zinc/copper/tin combination, the tin layers will, of course, be in contact when the parts are brought together. Alternatively the tin can be omitted and a single foil of copper alone can be used or a coating of zinc/copper can be formed on one surface and a coating of zinc only on the other.

A particular advantage of the use of the Zn/Cu/Sn combinations as the interlayer material is that it enables aluminium alloy parts to be bonded very rapidly at relatively low temperatures and pressures. Using a Zn/Cu/Sn coating on both surfaces or a zinc coating on both surfaces and two Cu/Sn foils with the tin layers in contact and heating at a temperature of from 250° to 300° C under a pressure of 10 to 1000 lbf/in², good bond strengths can be obtained in from 1 to 5 minutes. This ability to obtain good bond strengths between aluminium parts with such short heating periods is very valuable in certain technologies, such as packaging.

At these temperatures and times, that is 250° to 300° C for 1 to 5 minutes, the zinc diffuses into the aluminium on one side and into the copper layer on the other and at the same time, the tin diffuses into the copper layers. In the product, the zinc and tin have been wholly absorbed and the two aluminium alloy parts are each diffusion bonded to a layer of copper which remains between them.

If heating is effected at higher temperatures, for example 350° to 400° C, for longer periods, the same diffusion of the zinc and tin layers will occur and will be followed by diffusion of the copper into the aluminium parts so that a final product can be obtained in which there is no copper left between the aluminium parts and microscopic examination of a section through the bonded parts will show little change in the microstructure on going through the interface.

The magnesium and zinc combination is used in essentially the same way as the zinc, copper and, optionally, tin combination just described, the magnesium in this combination replacing the copper and optional tin of the former combination. The zinc should be coated on to both the surfaces to be bonded and a separate foil of magnesium may be used or magnesium may be coated on to one or both of zinc-coated surfaces to be bonded.

Whilst many types of joint can be made by the diffusion bonding process according to the invention, one particularly advantageous application is in the formation of T-joints. In a structure comprising a T-joint, there is considerable stress concentration at the right angles between the "upright" and the "horizontal" of the joint, and by using the process according to the invention, it is possible to exude, at these angles, a small portion of the liquid phase formed by melting of the interlayer material to form a meniscus filling the angle which is retained on subsequent absorption of the bulk of the liquid phase. The formation of such a meniscus or fillet in the angles considerably reduces the stress concentration at these points and thereby considerably improves the performance of the T-joint. The other methods of diffusion bonding referred to above, that is high and low pressure solid state bonding, tend to give rise to notches or cracks at the angles between the upright and the horizontal when these methods are used to produce T-joints and it will be appreciated that due to the stress concentration at these angles, such notches or cracks lead to a disproportionately large reduction in the performance of the T-joints obtained.

In order that the invention may be more fully understood, the following example is given by way of illustration only:

EXAMPLE

Two pieces of 0.01 inch thick aluminium were subjected to the following sequence of operations:

Pretreatment

Pretreatment was first effected to remove contaminants and oxide film from the surface of the aluminium. For this purpose, the aluminium pieces were first degreased in trichloroethylene, then soaked in an aqueous alkaline cleaner at 60°–70° C for 1 minute, washed in tap water, etched in a solution containing 150 ml sulphuric acid and 50 g chromium trioxide per liter of demineralised water at 60° C for 30 minutes, and were finally rinsed.

Zincate treatment

The parts were then immersed for 1 minute in a solution containing 500 ml nitric acid per liter of water, and then in a solution containing 100 g of zinc oxide and 540 g of caustic soda per liter of water at room temperature for 3 minutes. The pieces were rinsed in water and then again immersed in the zincating solution for the same period, and finally rinsed again in water.

Copper plating

The zinc coating obtained by the preceding stage was then electrolytically plated with copper in an aqueous bath containing, per liter:

| | |
|---|---|
| 38 g | sodium cyanide |
| 30 g | cuprous cyanide |
| 50 g | sodium potassium tartrate, and |
| 38 g | sodium carbonate. |

The bath had a pH of 9.5–10.5 and was used at a temperature of 40° C. The zincated aluminium pieces were connected as the cathode and plated at a current density of 100A/sq. meter for 10 minutes to obtain a copper coating 0.0005 inch thick. The pieces were then washed well with water.

Tin plating

The copper coating obtained by the preceding step was electrolytically plated with tin using an aqueous solution containing 70 g/liter sodium stannate and 6 g/liter caustic soda at 60° C with tin anodes at a current density of 200A/sq. meter, while polarising the workpiece to prevent corrosion of the exposed aluminium surface by the caustic soda. In 30 minutes a tin coating 0.0005 inch thick was obtained. The pieces were then washed and dried.

Bonding

The two pieces were brought together with the tin coatings in contact to form a lap joint and the assembly was heated at 250° C under pressure of 30 lbf/in² to maintain contact, for 1 minute.

After cooling, the joint was subjected to mechanical testing and failure was found to occur in aluminium itself and not at the joint.

A polished and etched section was made through the joint and was examined microscopically. It was seen that the zinc had diffused completely into the aluminium and the copper and the tin had diffused completely into the copper. A layer of copper remained between the two aluminium surfaces.

We claim:
1. A process for bonding aluminium alloy parts, which comprises the steps of:
   i. removing the oxide film from the surfaces of the parts which are to be bonded,
   ii. forming a coating of zinc directly on the oxide film-free surfaces,
   iii. providing additional separate layers of copper and tin, iv. forming an assembly with the zinc coatings and said additional layers positioned between the parts to be bonded, and v. maintaining said assembly under sufficient pressure to keep the integers thereof in contact over the desired bond area and at a temperature of from 250° to 300° C whereby the zinc and the tin are diffused into the adjacent integers and the aluminium alloys parts are bonded together with a layer of copper between them.

2. The process set forth in claim 1, wherein said copper and tin layers are successively coated on each of said zinc coatings.

3. The process set forth in claim 1 wherein said copper and tin layers are provided as foils having distinct layers of copper and tin.

4. The process set forth in claim 1, wherein said aluminium alloy parts are bonded to form a T-joint and, during heating, a small portion of the liquid phase formed is exuded to form a meniscus filling the angles between the two parts and said exuded material is retained and solidified within the angles following the heating step.

* * * * *